United States Patent Office 3,796,734
Patented Mar. 12, 1974

3,796,734
PREPARATION OF OMEGA-NITROESTERS BY THERMAL CLEAVAGE AND REACTION OF CYCLIC ALPHA-NITROKETONES WITH ALCOHOLS
Roger G. Duranleau, Ardonia, Mahmoud S. Kablaoui, Wappingers Falls, and Richard F. Love, Fishkill, N.Y., assignors to Texaco Inc., New York, N.Y.
No Drawing. Filed Dec. 8, 1971, Ser. No. 206,194
Int. Cl. C07c 79/40, 79/46
U.S. Cl. 260—404       18 Claims

ABSTRACT OF THE DISCLOSURE

A method for preparing omega-nitroesters by thermally cleaving and reacting a cyclic alpha-nitroketone with an alcohol in a non-aqueous environment at a temperature of from about 50 to about 200° C. The esters so prepared are useful as lubricant and fuel additives and as intermediates for the production of amino acids.

BACKGROUND OF THE INVENTION

This invention relates to a novel method of preparing nitroesters from cyclic nitroketones.

In particular, it relates to a non-catalytic method for preparing nitroesters from cyclic nitroketones wherein a single molecule is produced containing both a nitro and ester function.

Cleavage of cyclic alpha-nitroketones can be undertaken employing various nucleophiles. For example, alpha-nitrocyclohexanone can be cleaved employing sodium hydroxide to give sodium omega-nitrohexanoate. In a second stage, the organic acid is liberated by acidification with a mineral acid. Esterification of the liberated acid with an alcohol can in a further stage be accomplished by heating the reactants in the presence of a catalyst such as a mineral acid. In the reaction outlined above there is consumed at least one mole of base and one mole of acid. In addition a salt by-product is formed requiring disposal. Such a process involving a plurality of stages results in serious disadvantages in terms of economics and ultimately in the commercial attractiveness of the process.

It is therefore an object of this invention to provide a direct method for the preparation of omega-nitroesters.

It is another object of this invention to provide a method for the preparation of omega-nitroesters from cyclic alpha-nitroketones by a one step cleavage and esterification reaction.

Yet another object of this invention is to provide a method for preparing omega-nitroesters in high yields.

A further object of this invention is to provide a non-catalytic method for preparing omega-nitroesters.

Other objects and advantages will become apparent from a reading of the following detailed description and examples.

SUMMARY OF THE INVENTION

Broadly, this invention contemplates a method for the preparation of omega-nitroesters which comprises thermally cleaving and reacting a cyclic alpha-nitroketone with an alcohol at a temperature of from about 50 to 200° C. in a non-aqueous environment. The instant method produces one mole of an omega-nitroester from the reaction between one mole of cyclic alpha-nitroketone and one mole of alcohol.

According to our invention the cyclic alpha-nitroketones thermally cleaved and esterified herein correspond to the formula:

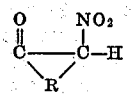

where R is a polymethylene radical of from 1 to 22 carbons or a substituted polymethylene radical of 2 to 22 carbons containing one or more substituents selected from the group consisting of alkyl and aryl. Illustrative of the cyclic alpha-nitroketones contemplated herein we mention 2-nitrocyclopentanone, 2-nitrocyclohexanone, 2-nitrocycloheptanone, 2-nitro-3-methylcyclopentanone, 2-nitro-4-methylcyclohexanone, 2-nitro-4-phenylcyclohexanone, 2-nitrocyclooctanone, 2-nitrocyclodecanone, 2-nitrocyclododecanone, 2-nitro-4-pentylcyclotetradecanone, 2-nitrocyclooctadecanone, 2-nitrocycloeicosanone and 2-nitrocyclodocosanone. The cyclic alpha-nitroketones employed as starting material herein may be prepared in the manner described in U.S. Pat. 3,466,326.

Alcohols employed in the instant process correspond to the formula: R'OH and include primary and secondary alcohols. Tertiary alcohols have not been found to be reactive in the instant thermal method. Thus, in the formula above R' can be an alkyl group of from 1 to 20 carbon atoms such as methyl, ethyl, propyl, butyl, hexyl, octyl, decyl, dodecyl or hexadecyl. Dihydroxy and polyhydroxy primary and secondary alcohols are also intended to be understood as operative in the instant process. Illustrative of the alcohols contemplated herein we mention methanol, ethanol, isopropanol, n-butanol, 2-hexanol, cyclohexanol, 2-octanol, 2-decanol, 1-dodecanol, 1-hexadecanol, ethylene glycol, propylene glycol and pentaerythritol. Mixtures of alcohols such as $C_{10}$ to $C_{13}$ alcohols are contemplated including isomeric mixtures containing primary and secondary alcohols. At least one mole and up to 100 moles of alcohol per mole of cyclic alpha-nitroketone are employed and preferably from 5 to 25 moles of alcohol per mole of cyclic nitroketone are present during the course of the reaction. Most importantly the reaction must be conducted in a non-aqueous environment, that is, in the substantial absence of water. The thermal cleavage and reaction is sensitive to water and water in amounts exceeding 0.1 weight percent based on the weight of the alcohol employed cause competing reactions to occur leading to the formation of acid instead of the desired nitroesters. In a highly preferred embodiment absolute alcohols are used. Excessive amounts of alcohol can be employed serving as solvent for the reaction or alternatively an inert reaction solvent may be employed such as n-hexane, n-heptane, xylene, ethylbenzene, dichlorobenzene, methylnaphthalene, dioxane and tertiary alcohols.

The simultaneous cleavage and esterification is conducted thermally, that is, in the absence of catalytic agents at temperatures of from about 50 to about 200° C., preferably from about 100 to 190° C. In practice, reactions below 50° C. are excessively slow and temperatures exceeding 200° C. are deleterious in that thermal decomposition of the cyclic nitroketone to a mixture of products occurs rather than the desired cleavage and esterification. Pressures of from 0 to 500 p.s.i.g.

may be employed. In general, if the alcohol employed boils above the selected operating temperature no pressure is necessary. When the alcohol possess a boiling point below that of the temperature selected the reaction can be conducted at autogenous pressure.

The omega-nitroesters prepared according to this invention correspond to the formula:

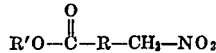

where R and R' are as heretofore defined. Specific examples of esters prepared by the instant thermal method include by way of example methyl 5-nitropentanoate, ethyl 6-nitrohexanoate, isopropyl 7-nitroheptanoate, 2-hexyl 5-nitro-4-methylpentanoate, n-butyl 6-nitro-4-phenylhexanoate, methyl 8-nitrooctanoate, 2-octyl 10-nitrodecanoate, ethyl 12-nitrododecanoate, n-propyl 18-nitrooctadecanoate and methyl 22-nitrodocosanoate. Such nitroesters are useful as nematocides, lubricant and fuel additives. Further they can be utilized as intermediates in the preparation of amino acids.

At the completion of the thermal cleavage and esterification reaction the product obtained comprises an omega-nitroester substantially free of by-products. To recover the nitroester the reaction mixture composed of excess alcohol and nitroester and, if present, solvent is distilled at atmospheric pressure to remove the alcohol and solvent. The residue is the omega-nitroester which can be further purified by vacuum distillation if desired.

In order to more fully illustrate the nature of our invention and manner of practicing the same the following examples are presented.

Example I

A cylindrical pressure reactor was equipped with a pressure gauge, thermometer, heating mantle and magnetic stirrer. The reactor was charged with 100 milliliters (2.5 moles) of of absolute methanol and 10.0 grams (0.069 mole) of 2-nitrocyclohexanone. After sealing the reactor, the temperature was raised to 150° C. and a pressure of 195 to 215 p.s.i.g. was maintained for 3 hours. After venting the reactor and cooling to a temperature of 25° C., a 110 milliliter aliquot was evaporated at a reduced pressure of 15 mm./Hg at a temperature of 55° C. to remove methanol. The oily residue weighed 10.5 grams (87 percent yield) and was identified by infrared and nuclear magnetic resonance analysis to be entirely methyl 6-nitrohexanoate.

Example II

To the reactor employed in Example I there was charged 2.0 grams (0.0088 mole) of 2-nitrocyclododecanone and 100 milliliters (2.5 mole) of absolute methanol. The reactor temperature was raised to 148–150° C. and a pressure of 189–215 p.s.i.g. for a period of 3 hours. An oily residue weighing 2.0 grams, after evaporation of methanol under a vacuum of 15 mm./Hg at 55° C., was recovered and identified by infrared analysis to be methyl 12-nitrododecanoate.

Example III

The reaction of Example II is repeated using 2.0 grams (0.011 mole) of 2-nitrocyclooctadecanone and 100 milliliters of absolute methanol. After sealing the reactor the temperature is raised to 148–150° C. and a pressure of 190 to 215 p.s.i.g. for 3 hours. There is recovered methyl 18-nitrooctadecanoate.

We claim:
1. A method for the preparation of omega-nitroesters which comprises thermally cleaving and reacting a cyclic alpha-nitroketone corresponding to the formula:

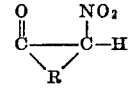

where R is a polymethylene radical of from 1 to 22 carbons or a substituted polymethylene radical of 2 to 22 carbons containing one or more substituents selected from the group consisting of alkyl and aryl, with an alcohol at a temperature of from about 50 to about 200° C. in a non-aqueous environment.

2. A method according to claim 1 wherein said alcohol is a primary or secondary alcohol corresponding to the formula R'OH where R' is an alkyl group of from 1 to 20 carbon atoms.

3. A method according to claim 1 wherein said temperature is from about 100 to 190° C.

4. A method according according to claim 1 wherein said cleaving and reacting is conducted at a pressure of from 0 to 500 p.s.i.g.

5. A method according to claim 1 wherein said cyclic alpha-nitroketone is 2-nitrocyclohexanone.

6. A method according to claim 1 wherein said cyclic alpha-nitroketone is 2-nitrocyclooctanone.

7. A method according to claim 1 wherein said cyclic alpha-nitroketone is 2-nitrocyclodecanone.

8. A method according to claim 1 wherein said cyclic alpha-nitroketone is 2-nitrocyclododecanone.

9. A method according to claim 1 wherein said alcohol is methanol.

10. A method according to claim 1 wherein said alcohol is ethanol.

11. A method according to claim 1 wherein said alcohol is isopropanol.

12. A method according to claim 1 wherein said alcohol is 2-octanol.

13. A method according to claim 1 wherein said alcohol is ethylene glycol.

14. A method according to claim 1 wherein said nitroester is methyl 6-nitrohexanoate.

15. A method according to claim 1 wherein said nitroester is methyl 8-nitrooctanoate.

16. A method according to claim 1 wherein said nitroester is 2-octyl 10-nitrodecanoate.

17. A method according to claim 1 wherein said nitroester is methyl 12-nitrododecanoate.

18. A method according to claim 1 wherein said nitroester is methyl 18-nitrooctadecanoate.

References Cited
UNITED STATES PATENTS
3,551,465    12/1970    Ellis _____ 260—410.9

LEWIS GOTTS, Primary Examiner
D. G. RIVERS, Assistant Examiner

U.S. Cl. X.R.
260—471 A, 478